May 29, 1934.   A. Y. DODGE   1,960,529
LUBRICATION DEVICE
Filed April 1, 1932
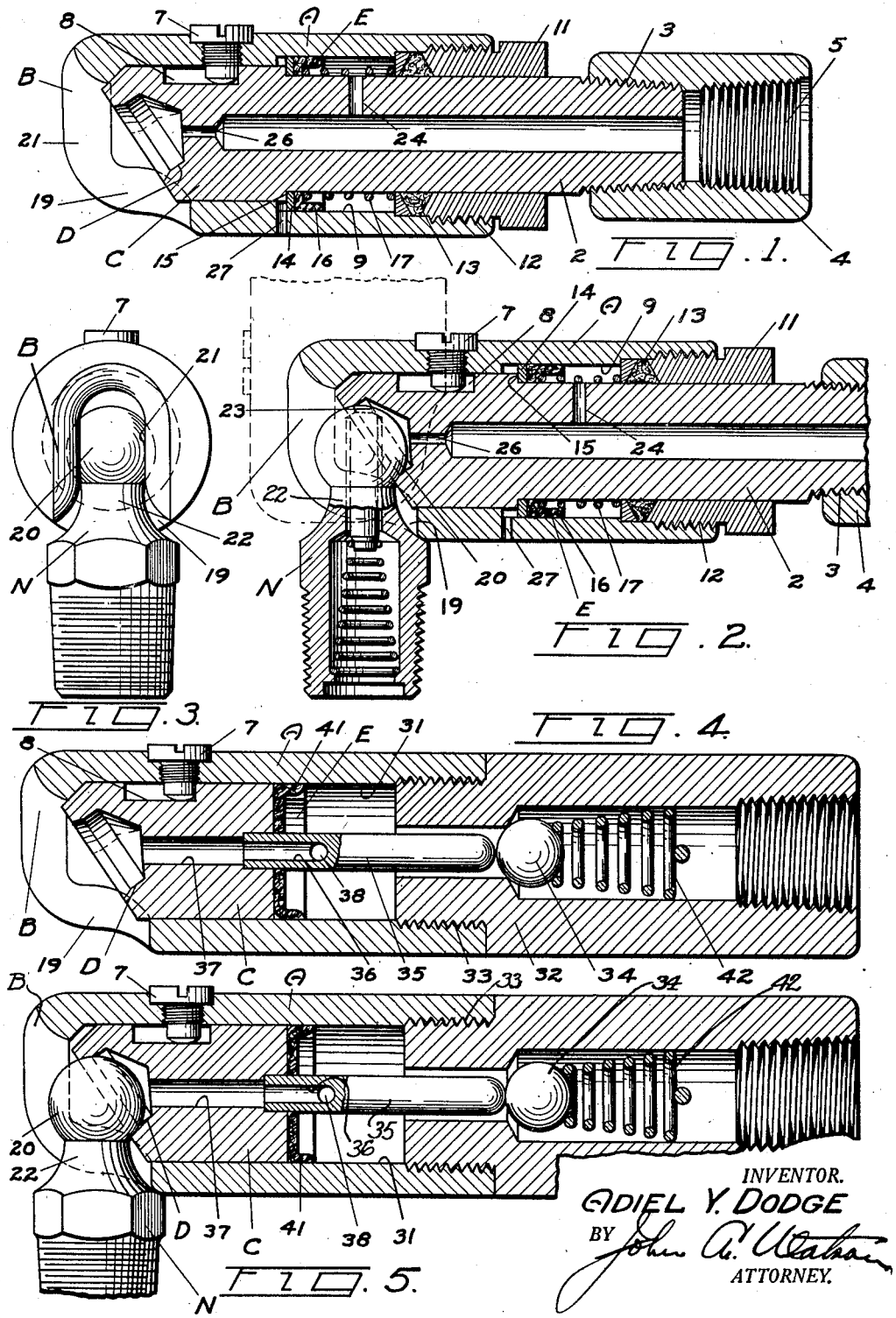
INVENTOR.
ADIEL Y. DODGE
BY
ATTORNEY.

Patented May 29, 1934

1,960,529

UNITED STATES PATENT OFFICE 1,960,529

LUBRICATION DEVICE

Adiel Y. Dodge, South Bend, Ind., assignor to The Lubrication Corporation, South Bend, Ind., a corporation of Delaware Application April 1, 1932, Serial No. 602,421

4 Claims. (Cl. 285—143)

This invention relates to improvements in lubrication devices and more particularly to clamp type lubricant discharge nozzles.

An object of the invention is to provide an improved lubricant pressure operated clamp type discharge nozzle for servicing lubrication nipples or fittings of the type wherein an interlock between the discharge nozzle and the fitting is contemplated.

Another object is to provide a clamp type lubricant discharge nozzle having means for initially clamping the head of a lubrication nipple yieldingly to the discharge orifice of the nozzle and thereafter providing an increase in clamping function proportional to the pressure of the lubricant with which the nozzle is supplied.

Another object is to provide a lubricant discharge nozzle having means for preventing the exuding of lubricant through the discharge orifice of the nozzle at slight pressures such as might be present during the removal of the nozzle from the fitting after the operating pressure applied to the lubricant has been released.

Another object is to provide a clamp type lubricant discharge nozzle wherein lubricant may not pass through the nozzle until after engagement of the nozzle with the nipple has been effected.

Another object is to provide a lubricant discharge nozzle of the clamp type which is easy to operate, simple in construction and which may be manufactured at relatively low cost.

Other objects, the advantages, and uses of the invention, will be, or should become apparent after reading the following description and claims and after consideration of the accompanying drawing forming a part of this specification in which:

Fig. 1 is a sectional view of a clamp type lubricant discharge nozzle embodying features of my invention, and shown prior to the engagement with a lubrication fitting;

Fig. 2 is a view similar to Fig. 1 but illustrating the nozzle as engaged with the fitting;

Fig. 3 is an end elevation of the nozzle as illustrated in Fig. 2;

Fig. 4 is a sectional view of another embodiment of the invention shown prior to engagement with a lubrication fitting; and Fig. 5 is a view similar to Fig. 4 but illustrating the nozzle as engaged with the fitting.

In general the lubricant discharge nozzles selected for illustration herein comprise a tubular member A one end of which is fashioned to provide a lubricant fitting or nipple engaging clamp portion B, a member C disposed within the member A forming a lubricant conduit having a discharge orifice D adapted for registration with the head of a lubrication nipple or fitting N and mechanism E responsive to lubricant pressure in the conduit A for causing relative movement between the members A and C to clamp the nozzle securely in operative engagement with the fitting N.

In Figs. 1 to 3 of the drawing I have illustrated one form of my improved lubricant discharge nozzle wherein the member C comprises an elongated conduit 2 externally threaded at its rearmost end 3 for engagement with a screw threaded coupling member 4. The member 4 is internally threaded at 5 for direct connection to a lubricant pressure pump or, if preferred, to a lubricant conducting hose the other end of which may be connected with a lubricant pump or dispenser.

A screw stud 7 extends through the wall of the tubular member A and into a groove or notch 8 located on the outer wall of the member C so as to prevent rotational movement of the member C but to permit relative longitudinal movement between the members A and C.

The member A is formed with an internally enlarged portion 9 forming an annular pressure chamber about the outer wall of the member C. A packing bushing 11 is disposed about the member C and secured by threaded engagement 12 to the member A. A suitable packing 13 is provided to establish a lubricant tight seal between the member C and the bushing 11.

An annular piston member 14 is disposed about the conduit 2 and arranged to bear against a shoulder 15 formed on the outer wall of the conduit. Piston packing 16 is provided for the member 14. The packing 16 may be of the cup type and may be made of raw hide or other suitable packing material. A compression spring 17 is located about the conduit 2 with its opposite ends bearing against the adjacent faces of the packing members 16 and 13 respectively. The spring 17 functions to maintain the members A and C yieldingly in that position shown in Fig. 1 with that end of the conduit 2 including the discharge orifice D advanced toward the adjacent inner wall portions of the clamp member B.

With reference to Figs. 2 and 3 the fitting or nipple engaging clamp portion B of the member A is formed by providing a relatively large opening 19 laterally through one side wall of the member A of sufficient diameter to permit the head 20 of the fitting N to pass therethrough. A continuing and reduced portion 21 of the opening 19 extends forwardly and across the outer end of the member A. The width of the portion 21 of the opening 19 is sufficient to permit the passage of the neck 22 of the fitting N therethrough but is of less width than the diameter of the head 20 of the fitting.

When the fitting N is in the position shown in Fig. 2 the head 20 of the fitting is therefore held yieldingly in engagement with the discharge orifice D of the nozzle due to the function of the spring 17 which tends yieldingly to cause relative movement between the members A and C. This arrangement and combination of parts including particularly the enlarged head of the fitting N permits quick attachment and detachment of the nozzle to the head of the fitting under the yielding pressure exerted upon the parts A and C by the spring 17. In other words the nozzle, while held by the operator in one hand, may be snapped over the head 20 of the fitting and operative registration of the discharge orifice D and the lubricant port 23 of the fitting easily established regardless of the angle of approach. In Fig. 2 I have shown the discharge nozzle in dotted profile as it would appear at an angle of approach substantially 90° from that shown in full lines to illustrate the wide range in axial relationship permissible between the fitting and the nozzle during both approach and servicing.

Subsequent to the initial engagement of the nozzle and fitting lubricant under pressure may be admitted through the conduit 2 to the discharge orifice D and conducted therefrom through the nipple N into the bearing or similar structure with which the nipple is associated. A passage 24 is provided for establishing communication between the annular chamber defined by the enlarged portion 9 of the member A and the adjacent side walls of the conduit 2 so that lubricant under operating pressure may be conducted to the chamber to act upon the relatively large area of the annular piston assembly 14—16 to cause relative movement between the members A and C. The force applied to the relatively moving parts will be in proportion to the pressure applied to lubricant in the conduit 2 so that the clamping function of the nozzle may at all times be proportional to the operating pressure.

In order that lubricant may not be extruded through the discharge orifice D after the operating pressure is cut off and the nozzle disengaged from the fitting the mouth of the conduit adjacent to the discharge orifice D is formed with a constricted portion 26 of such diameter as to resist the passage of lubricant therethrough under pressure less than five pounds per square inch.

An air bleed passage 27 is provided through the side wall of the member A ahead of the piston assembly 14—16 so that air displaced by the piston assembly as it moves forwardly in the annular chamber 9—2 may escape therethrough.

My improved clamp type discharge nozzle, as herein described, may be initially engaged with a lubrication nipple or fitting through a wide angular range of approach by lateral movement of the nozzle toward and about the head 20 of the fitting. It is only necessary that the head pass through the opening 19 so that the spherical surface of the head may engage with and press the member C rearwardly against the force of the spring 17 until the discharge orifice D has partially encompassed the head. Yielding pressure exerted by the spring 17 will maintain operative engagement of the members A and C with the fitting until such time as lubricant under pressure is caused to flow through the conduit 2 whereupon the cooperating members A and C are further urged toward the position shown in Fig. 1 by forces in direct proportion to the operating pressure of the lubricant present in the conduit 2.

Disengagement of the nozzle and fitting may be accomplished subsequent to the release of the lubricant pressure in the conduit 2 by merely moving the nozzle laterally with respect to the fitting against the slight pressure of the spring 17.

In Figs. 4 and 5 I have illustrated another embodiment of my invention wherein the member C is constructed to function as a piston within a cylinder formed by the inner walls 31 of the tubular member A. The rearward end of the member A is closed by a lubricant conduit 32 secured thereto by screw threads 33. A spring pressed ball check valve 34 is disposed within the conduit 32 to normally preclude the flow of lubricant forwardly through the conduit. A valve push rod 35 is secured to the rear face of the member C and extended rearwardly to a point adjacent to but not actually engaging the ball of the valve 34. The push rod 35 has a passage 36 communicating with the lubricant passage 37 in the member C extending rearwardly from the discharge orifice D. The passage 36 is connected with a bore 38 formed transversely through the rod 35 the opposite ends of which communicate with that space immediately to the rear of the member C.

A cup shape annular packing member 41 preferably of raw hide is disposed about the push rod 35 and against the rear face of the member C so that lubricant under pressure at the rear of the member C will cause relative movement between the members A and C, as in the case of that form of the discharge nozzle previously described, to provide clamping pressure between fitting and nozzle in direct proportion to the operating pressure of the lubricant conducted therethrough.

The spring 42 of the valve 34 acting upon the push rod 35, through the valve normally maintains the member C in that position with respect to the clamping member B illustrated in Fig. 4.

Initial engagement of the nozzle and fitting is carried out precisely in the same manner as that described in connection with Figs. 1 to 3 except that it is unnecessary to ascertain that the lubricant pressure from the dispenser or pump is cut off as the check valve 34 prevents passage of lubricant through the conduit 32 to the nozzle until such time as the piston like member C has been moved rearwardly from that position shown in Fig. 4 to that position shown in Fig. 5.

Upon initial engagement of the nozzle with the fitting N the check valve 34 is opened, as shown in Fig. 5, by rearward movement of the member C and push rod 35. Lubricant is thereupon free to pass through the conduit 32, the bore 38 and the passage 37 into the discharge orifice D where it may be conducted to the port 23 of the fitting N.

It should be understood that the embodiments of the invention herein set forth are presented for the purpose of illustration only, and various changes may be made without departing from the spirit of the invention and the scope of the claims.

I claim:

1. A lubricant discharge nozzle comprising a conduit having a discharge orifice, a clamp member slidably disposed on said conduit and adapted to clamp a lubrication nipple to said discharge orifice, resilient means arranged normally to maintain the conduit and said clamping member of the nozzle in their nipple clamping positions, said clamping member and said discharge conduit having their cooperating nipple engaging portions formed to provide for substantially universal engagement with a nipple when said member and said conduit bear a predetermined angular relationship with one another about their common axes, means disposed exteriorly of said conduit responsive to lubricant pressure in said conduit for causing relative movement between said clamping member and said conduit, and means for preventing rotational movement between said conduit and said clamp member.

2. A lubricant discharge nozzle comprising a relatively stationary conduit having a discharge orifice at one end and adapted for connection with a lubricant supply under pressure at its other end, a tubular member slidably mounted upon said conduit formed with a clamp member at its forward end in cooperative relation with said conduit at said discharge orifice, said tubular member having an annular cavity on its inner side wall co-operating with the adjacent side wall of said conduit to form an annular chamber, and a piston associated with said conduit disposed in said chamber, said conduit having a passage through the side wall thereof communicating with said annular chamber whereby lubricant under pressure from said conduit may be admitted to said chamber.

3. A lubricant discharge nozzle comprising a relatively stationary conduit having a discharge orifice at one end and adapted for connection with a lubricant supply under pressure at its other end, a tubular member slidably mounted upon said conduit formed with a clamp member at its forward end in cooperative relation with said conduit at said discharge orifice, said tubular member having an annular cavity on its inner side wall cooperating with the adjacent side wall of said conduit to form an annular chamber, a piston associated with said conduit disposed in said chamber, said conduit having a passage through the side wall thereof communicating with said annular chamber whereby lubricant under pressure from said conduit may be admitted to said chamber, and resilient means in said chamber for urging said clamping member and said conduit toward one another.

4. A clamp type lubricant coupler comprising, a conduit providing a lubricant passageway having a discharge orifice at one end, said conduit having its other end reduced in diameter and adapted for connection to a source of lubricant supply, a tubular member slidably mounted upon said conduit, and means associated with the tubular member for clamping said conduit against a lubricant receiving fitting upon relative sliding movement in one direction between the tubular member and the conduit, said tubular member having an annular cavity in its inner wall cooperative with a region of said conduit including a portion of normal diameter and a portion of the conduit of said reduced diameter to provide a lubricant pressure-operated instrumentality for causing relative sliding action between the tubular member and the conduit in said direction, said conduit being further provided with a lubricant connection between its lubricant conducting passageway and the annular cavity of said tubular member.

ADIEL Y. DODGE.